Patented Sept. 6, 1932

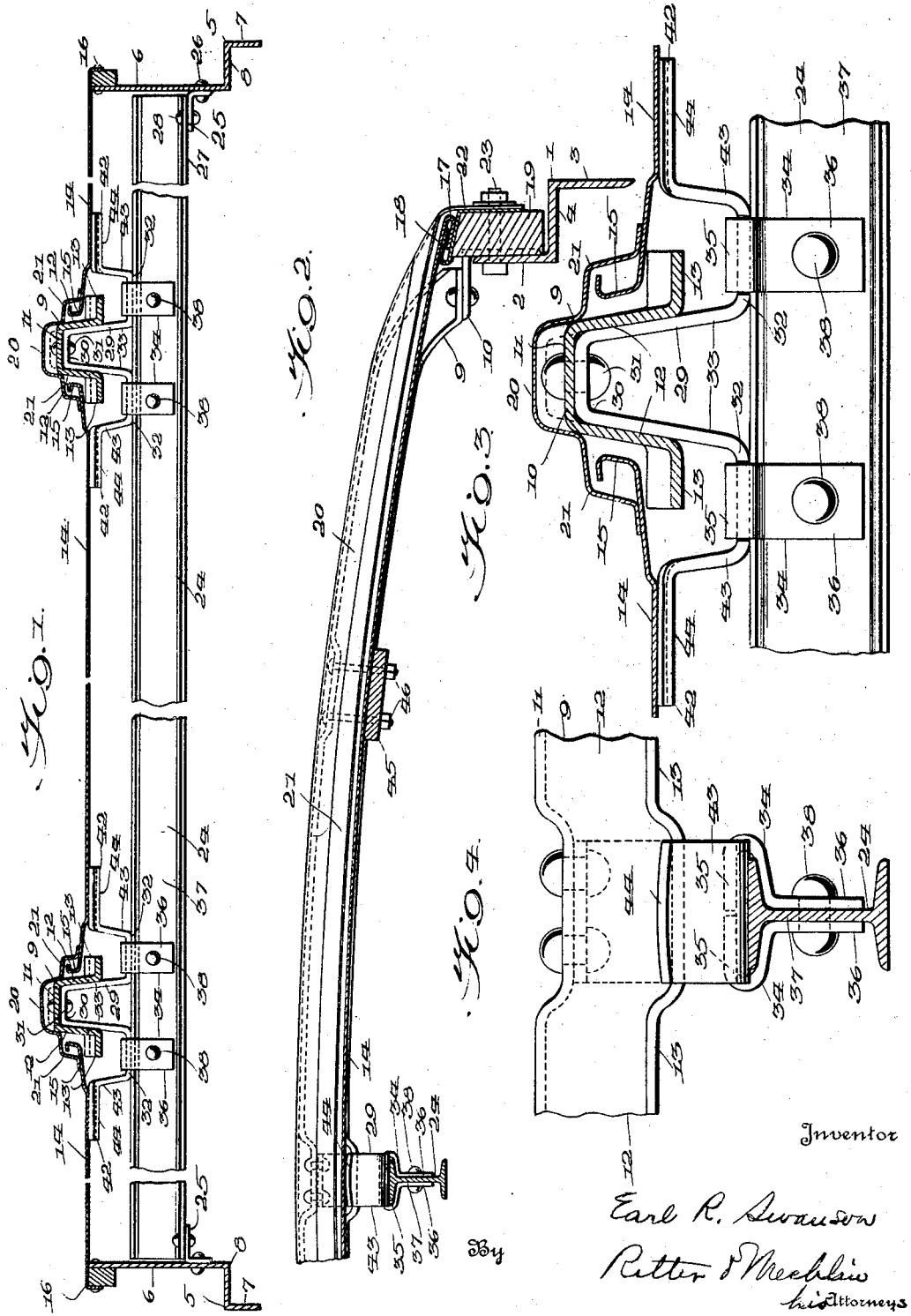

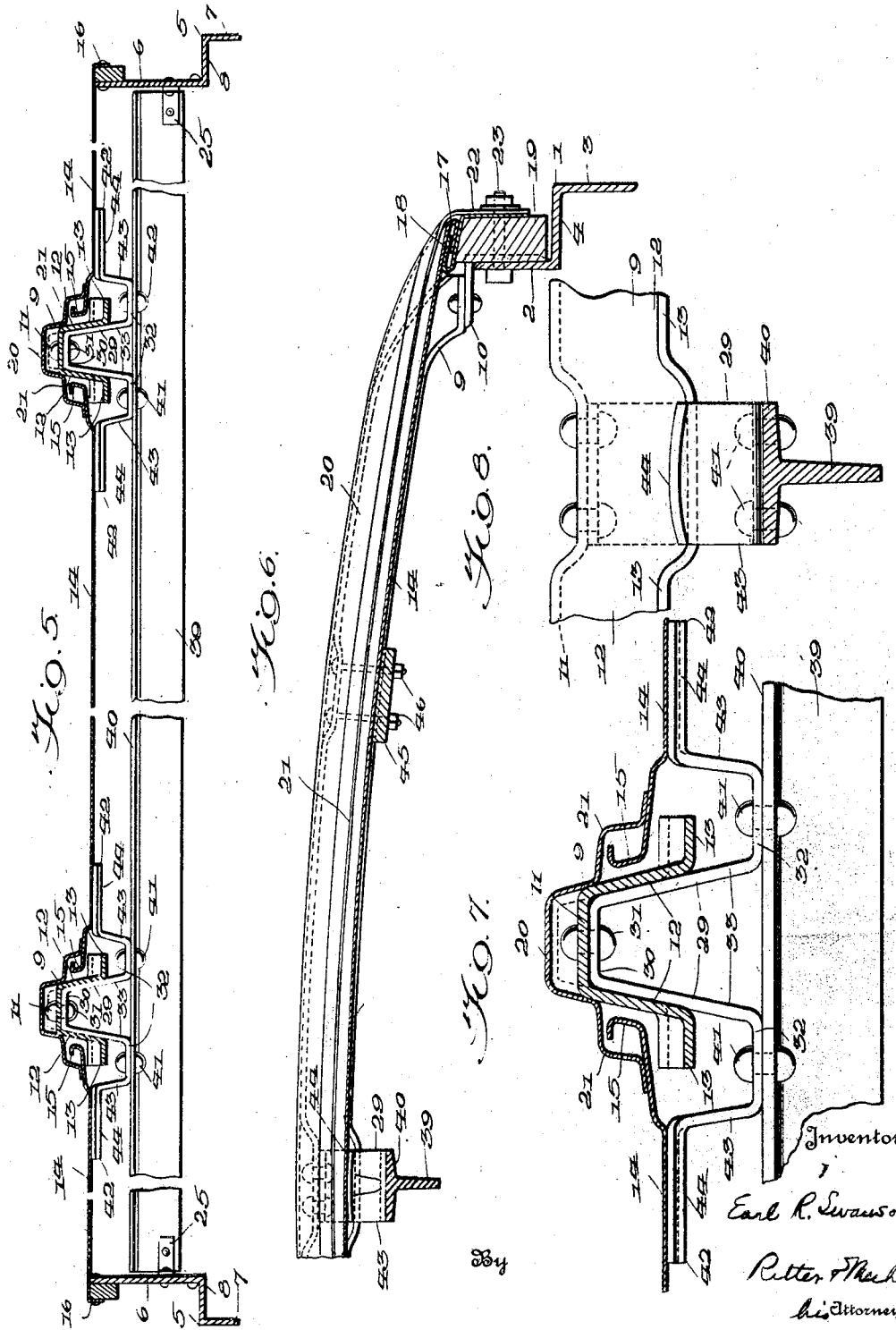

1,875,831

UNITED STATES PATENT OFFICE

EARL R. SWANSON, OF CHICAGO, ILLINOIS, ASSIGNOR TO CHICAGO-CLEVELAND CAR ROOFING COMPANY, OF CHICAGO, ILLINOIS, A CORPORATION OF DELAWARE

RAILWAY CAR

Application filed May 27, 1929. Serial No. 366,399.

My invention relates to railway cars and more particularly to a load lifting device adapted to be associated with the roof structure.

The principal object of the invention is to provide means extending longitudinally of the car in spaced relation to the roof sheets affording means for receiving a rope, chain or other hoist device whereby automobiles and other articles may be raised above the car floor.

A primary feature of the invention consists in providing a car roof of the type involving carlines and roof sheets, with a beam member extending longitudinally of the car in spaced relation to the roof sheets, which is connected to the carlines by brackets having portions for supporting adjacent portions of neighboring roof sheets.

Another feature of the invention resides in constructing a car roof of the type involving carlines and roof sheets, with a beam member extending longitudinally of the car in spaced relation to the roof sheets, the beam being secured to each of the carlines by brackets which are integrally formed with extensions projecting on opposite sides of the associated carline for supportingly engaging adjacent portions of neighboring roof sheets.

A still further feature of the invention consists in providing a car roof of the type involving carlines and roof sheets, with a beam member extending longitudinally of the car in spaced relation to the roof sheets, the beam member being connected to the carlines by brackets each of which is fashioned with a central portion for attachment to the associated carline, intermediate portions for attachment to the beam member and end portions for supportingly cooperating with adjacent portions of neighboring roof sheets.

Other and more specific features of the invention residing in advantageous forms, combinations and relations of parts will hereinafter appear and be pointed out in the claims.

In the drawings illustrating preferred embodiments of the invention—

Figure 1 is a fragmentary longitudinal sectional view of a car roof embodying one form of the invention.

Figure 2 is a fragmentary transverse sectional view of the roof illustrated in Figure 1.

Figure 3 is an enlarged detail view of the portion of the roof construction shown in Figure 1 adjacent one of the carlines.

Figure 4 is an enlarged detail view taken at right angles to Figure 3, the roof sheets and associated seam cap being omitted.

Figure 5 is a view similar to Figure 1 illustrating a modified form of the invention.

Figure 6 is a view similar to Figure 2 illustrating the modified form shown in Figure 5.

Figures 7 and 8 are, respectively, views corresponding to Figures 3 and 4 illustrating the modified form.

As the construction of the roof on opposite sides of its longitudinal center is identical the transverse sectional views illustrated in Figures 2 and 6 depict only a little more than one half of the roof structure. Since the construction of the roof illustrated in Figures 1 to 4, inclusive is the same as that illustrated in Figures 5 to 8, inclusive, with the exception of certain features of construction which will be hereinafter pointed out, corresponding parts in these two groups of figures will be designated by similar reference numerals.

Referring more particularly to the drawings, 1 indicates one of the side plates of the car roof which is of Z-shape and has oppositely projecting vertical flanges 2 and 3, respectively, and an intermediate substantially horizontal web 4. The end plates 5 of the roof which, as is well known, are rigidly connected to the side plates, are also of Z-shape having vertical flanges 6 and 7 connected by a horizontal web 8.

Extending continuously from one side of the car to the other are carlines 9 connected at their opposite ends to the adjoining side plates by brackets 10. Each carline is preferably of inverted channel shape having a web 11 and downwardly projecting substantially vertical sides 12 which terminate in lateral base flanges 13. Also extending continuously from one eaves edge of the roof to the other are roof sheets 14 which span the spaces between adjacent carlines. The lateral edges of each of the roof sheets with the exception of the end roof sheets, terminate in upwardly projecting flanges 15 spaced slightly away from the adjacent sides of the associated carlines. The outside lateral edges of the end roof sheets are flanged downwardly as at 16 so that they may be conveniently attached to the adjoining end plates.

At their eaves edges the roof sheets are bent inwardly as at 17 to cooperate with the flashing strips 18 mounted upon side fascias 19 which are carried by the respective side plates 1. The adjoining edges of the roof sheets are connected by seam caps 20, respectively embracing the carlines 9. The sides of the seam caps are offset as at 21 to form housings for the upturned flanges 15 of the roof sheets and the lower portions of the seam caps engage the upper surface of adjacent portions of neighboring roof sheets. The ends of the seam caps may be flanged downwardly as at 22 and secured to the side plates and fascias by bolts 23. Intermediate their ends the seam caps may be firmly secured to the carlines by any suitable means, not shown.

The load lifting device 24, illustrated in the present instance as an I-beam, extends longitudinally of the car substantially midway between the ends of the carlines in spaced relation to the roof sheets. At its ends the beam may be secured to the end plates by any suitable means such as brackets 25 which are connected to the flange 6 of the end plates by rivets 26 and to the lower flange 27 of the I-beam by rivets 28. Intermediate its ends the beam member is supported in spaced relation to the roof sheets by brackets 29, one of which is secured to each of the carlines.

Each bracket is fashioned with a substantially horizontal central or web portion 30 adapted to be secured to the under side of the web 11 of the associated carline by one or more rivets 31. Offset downwardly from the web 30 and disposed on opposite sides thereof each bracket is provided with substantially horizontal portions 32 affording means to which the beam member may be connected. The portions 33 of the brackets which connect the portions 32 thereof with the web are arranged preferably contiguous to and parallel with the sides 12 of the carlines.

Clips 34 may advantageously be employed for connecting the beam member to the portions 32 of the bracket. These clips are arranged in pairs on opposite sides of the beam member and each is fashioned with a horizontal part 35 which partially overlies the portion 32 of the bracket and with a vertical portion 36 adapted to be secured to the web. By thus forming the brackets and the clips, securing the latter to the beam member and interposing a portion of the brackets between the clips and beam member, it will be readily perceived that the latter is rigidly supported in spaced relation to the roof sheets whereby sufficient clearance is provided between it and the roof sheets to permit a chain, rope or other hoisting device to pass therebetween and be supported by the beam.

In Figures 5 to 8, inclusive of the drawings the beam member disclosed, instead of being of I-section, may be of T-section having a stem 39 and a flange 40. The brackets employed may be similar to that shown in Figures 1 to 4, inclusive, and the horizontal portions 32 thereof may be conveniently connected to the flange 40 of the T by rivets 41 disposed on opposite sides of the stem 39.

Each bracket may also be provided with parts disposed on opposite sides of the associated carline for supportingly engaging the undersides of adjacent portions of neighboring roof sheets. In each form of the invention the brackets are shown as being integrally formed with extensions 42, respectively fashioned with a substantially upright portion 43 and substantially horizontal portions 44 which are disposed on opposite sides of associated carlines and offset from the horizontal portions 32 of the brackets. To insure a line contact between the roof sheet engaging portions of the brackets and the sheets to thereby prevent them from buckling the upper surfaces of these portions are preferably curved, their radius of curvature being somewhat less than that of the roof sheets. The portions of the roof sheets intermediate the ridge and eaves of the roof are supported by the usual purlins 45 which may be connected to the carlines by bolts 46.

From the foregoing it will be appreciated that in addition to providing the roof structure with a convenient means capable of functioning as a load lifting device, means are also provided for supporting portions of the roof sheets adjacent the ridge of the roof.

I claim:

1. In a roof for railway cars, the combination with a plurality of carlines, of roof sheets respectively associated with and spanning the spaces between the carlines, a beam member extending longitudinally of the car in spaced relation to the roof sheets, and brackets for connnecting said beam member to the carlines, each of said brackets having off-set portions respectively secured to the beam and to the associated carline, the portion of each bracket secured to the beam being rigidly provided with means for supportingly cooperating with an adjacent portion of a neighboring roof sheet.

2. In a roof for railway cars, the combination with a plurality of carlines, of roof sheets respectively associated with and spanning the spaces between the carlines, a beam member extending longitudinally of the car in spaced relation to the roof sheets and substantially midway between the ends of the carlines, and brackets respectively connecting the latter to said beam member, each of said brackets being provided with a substantially horizontal portion rigidly secured to the beam and with a plate-like portion spaced above the latter for supportingly cooperating with an adjacent portion of a neighboring roof sheet.

3. In a roof for railway cars, the combination with a plurality of carlines, of roof sheets respectively associated with and spanning the spaces between the carlines, a beam member extending longitudinally of the car in spaced relation to the roof sheets, and a plurality of brackets respectively connecting the beam member to the carlines, each of said brackets being provided with offset portions respectively secured to the beam and to the associated carline, the portion of each bracket secured to the beam being integrally formed with an extension for supportingly cooperating with an adjacent portion of a neighboring roof sheet.

4. In a roof for railway cars, the combination with a plurality of carlines, of roof sheets respectively associated with and spanning the spaces between the carlines, a beam member extending longitudinally of the car in spaced relation to the roof sheets and brackets for connecting the beam member to the carlines, each of said brackets having a plurality of offset portions, one of said offset portions affording means for connecting the beam thereto and another of said offset portions affording means for supportingly cooperating with the undersides of adjacent portions of the neighboring roof sheets.

5. In a roof for railway cars, the combination with a plurality of carlines each having a web and downwardly projecting sides, of roof sheets respectively associated with and spanning the spaces between the carlines, a beam member extending longitudinally of the car in spaced relation to the roof sheets, and brackets connecting the beam member to the carlines, each of said brackets being provided with a plurality of offset portions, one of said portions affording means for attaching the bracket to the associated carline, another of said portions affording means for attaching the bracket to the beam member, and another of said portions affording means for supportingly cooperating with adjacent portions of neighboring roof sheets.

6. In a roof for railway cars, the combination with a plurality of carlines, of roof sheets respectively associated with and spanning the spaces between the carlines, a beam member extending longitudinally of the car in spaced relation to the roof sheets, and brackets connecting the beam member to the carlines, each of said brackets having a central portion secured to the associated carline and with offset portions disposed on opposite sides of the median line of the carline secured to the beam, said brackets being also provided with portions outwardly of said last-named portions for supportingly cooperating with adjacent portions of neighboring roof sheets.

7. In a roof for railway cars, the combination with a plurality of carlines each having a web and downwardly projecting sides, of roof sheets respectively associated with and spanning the spaces between the carlines, a beam member extending longitudinally of the car in spaced relation to the roof sheets, and brackets for connecting the beam members to the carlines, each of said brackets having a central portion for attachment to the web of the associated carline, intermediate portions for attachment to said beam member and end portions for supportingly cooperating with adjacent portions of neighboring roof sheets.

8. In a roof for railway cars, the combination with a plurality of carlines, of roof sheets respectively associated with and spanning the spaces between the carlines, a beam member extending longitudinally of the car in spaced relation to the roof sheets, and brackets for connecting said beam member to the carlines, each of said brackets being provided with extensions engaging the undersides of adjacent portions of neighboring roof sheets for supporting them, the upper surfaces of said extensions of the brackets being curved.

9. In a roof for railway cars, the combination with a plurality of carlines, of roof sheets, respectively associated with and spanning the spaces between the carlines, a beam member extending longitudinally of the car in spaced relation to the roof sheets, said member having a web and a top flange, brackets interposed between the beam member and carlines and rigidly secured to the latter, each of said brackets having a substantially horizontal portion overlying the top flange of the beam member and clips for respectively connecting the brackets to the horizontal flange of the horizontal portions of the beam member.

10. In a roof for railway cars, the combination with a plurality of carlines, of roof sheets respectively associated with and spanning the spaces between the carlines, a beam member extending longitudinally of the car having a web and a top flange, brackets interposed between the beam and carlines and secured to the latter, and clips secured to the web of the beam member and having portions overlying the respective brackets for supporting the beam member in spaced relation to the undersides of the roof sheets.

11. In a roof for railway cars, the combination with a plurality of carlines, of roof sheets respectively associated with and spanning the spaces between the carlines, a beam member extending longitudinally of the car having a web and a top flange, a plurality of clips secured to said beam member, a bracket secured to each of said carlines and having portions respectively interposed between the top flange of the beam member and adjacent clips, said brackets also being provided with portions for supportingly cooperating with adjacent portions of neighboring roof sheets.

12. In a roof for railway cars, the combination with a plurality of carlines, each having a web and substantially vertical sides, of roof sheets respectively associated with and spanning the spaces between the carlines, a beam member extending longitudinally of the car in spaced relation to the roof sheets, and brackets for connecting said beam member to the carlines, each of said brackets having a substantially horizontal web secured to the web of the carline and downwardly extending portions arranged substantially parallel with the sides of the carlines, said downwardly extending portions terminating in substantially horizontal portions affording means to which the beam is connected.

13. In a roof for railway cars, the combination with a plurality of carlines, each of said carlines having a web and downwardly extending portions, of roof sheets respectively associated with and spanning the spaces between the carlines, a beam member extending longitudinally of the car in spaced relation to the roof sheets, and brackets for connecting said beam member to the carlines, each of said brackets having a web portion secured to the web of the associated carline and downwardly extending legs terminating in oppositely projecting horizontally disposed portions rigidly secured to the beam.

14. In a roof for railway car, the combination with a plurality of carlines, each of said carlines having a web and downwardly extending portions, of roof sheets respectively associated with and spanning the spaces between the carlines, a beam member extending longitudinally of the car in spaced relation to the roof sheets, and brackets for connecting said beam member to the carlines, each of said brackets having a web portion secured to the web of the associated carline and downwardly extending legs terminating in oppositely projecting horizontally disposed portions rigidly secured to the beam, said horizontal portions being integrally provided with plate-like extensions spaced above the beam for supportingly cooperating with adjacent portions of neighboring roof sheets.

15. In a roof for railway cars, the combination with a plurality of carlines, of roof sheets respectively associated with and spanning the spaces between the carlines, a beam member extending longitudinally of the car in spaced relation to the roof sheets, and an angularly shaped bracket rigidly secured to each carline for connecting the beam to the latter, each of said brackets being integrally formed with means spaced above the beam for supportingly cooperating with an adjacent portion of a neighboring roof sheet.

In testimony whereof I affix my signature.

EARL R. SWANSON.